United States Patent
Dakemoto

(10) Patent No.: US 11,001,270 B2
(45) Date of Patent: May 11, 2021

(54) DRIVING SUPPORT DEVICE INCLUDING A CLEANING DEVICE FOR CLEANINING A WINDOW PORTION

(71) Applicant: TOYOTA JIDOSHA KABUSHIKI KAISHA, Toyota (JP)

(72) Inventor: Masumi Dakemoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 16/373,936

(22) Filed: Apr. 3, 2019

(65) Prior Publication Data

US 2019/0308634 A1 Oct. 10, 2019

(30) Foreign Application Priority Data

Apr. 6, 2018 (JP) .............................. JP2018-073738

(51) Int. Cl.
| | |
|---|---|
| *B60W 50/00* | (2006.01) |
| *B60S 1/46* | (2006.01) |
| *B60W 10/30* | (2006.01) |
| *B60W 10/20* | (2006.01) |
| *B60W 30/12* | (2020.01) |
| *B60S 1/54* | (2006.01) |

(52) U.S. Cl.
CPC ........... *B60W 50/0098* (2013.01); *B60S 1/46* (2013.01); *B60S 1/54* (2013.01); *B60W 10/20* (2013.01); *B60W 10/30* (2013.01); *B60W 30/12* (2013.01); *B60W 2540/00* (2013.01)

(58) Field of Classification Search
CPC ......... B60K 28/00–165; G05D 1/0061; G05D 1/0088; G05D 1/021; G05D 1/0214; G05D 1/0221; G05D 1/0223; B60S 1/46; B60W 10/20; B60W 10/30; B60W 2540/00
See application file for complete search history.

(56) References Cited

U.S. PATENT DOCUMENTS

| | | |
|---|---|---|
| 2005/0270145 A1 | 12/2005 | Kataoka et al. |
| 2006/0025918 A1 | 2/2006 | Saeki |
| 2009/0300013 A1* | 12/2009 | Kodavalla ........... G06F 16/2246 |
| 2019/0300013 A1* | 10/2019 | Shiraishi ............... G05D 1/0061 |
| 2019/0322245 A1* | 10/2019 | Kline ..................... B60S 1/485 |
| 2020/0139939 A1* | 5/2020 | Kubota .................. G01S 7/497 |

FOREIGN PATENT DOCUMENTS

| | | |
|---|---|---|
| JP | 2003-320866 A | 11/2003 |
| JP | 2006-315491 A | 11/2006 |
| JP | 2008-060874 A | 3/2008 |
| JP | 2008-195402 A | 8/2008 |

(Continued)

*Primary Examiner* — Thomas G Black
*Assistant Examiner* — Ana D Thomas
(74) *Attorney, Agent, or Firm* — Sughrue Mion, PLLC

(57) ABSTRACT

A driving support device includes an electric control unit and a cleaning device. The electric control unit is configured to select one mode of a first mode based on a premise that a driver is touching a steering wheel and a second mode not based on the premise that the driver is touching the steering wheel. The electric control unit is configured to permit cleaning of the cleaning device when a cleaning request is issued and the mode is the first mode and to prohibit cleaning of the cleaning device when the mode is the second mode.

4 Claims, 10 Drawing Sheets

(56) References Cited

FOREIGN PATENT DOCUMENTS

| | | |
|---|---|---|
| JP | 4172434 B2 | 8/2008 |
| JP | 4349210 B2 | 7/2009 |
| JP | 2009-190464 A | 8/2009 |
| JP | 2010-006279 A | 1/2010 |
| JP | 4929777 B2 | 2/2012 |
| JP | 2014-148293 A | 8/2014 |
| JP | 2015-231765 A | 12/2015 |

* cited by examiner

DRIVING SUPPORT DEVICE INCLUDING A CLEANING DEVICE FOR CLEANINING A WINDOW PORTION

INCORPORATION BY REFERENCE

The disclosure of Japanese Patent Application No. 2018-073738 filed on Apr. 6, 2018 including the specification, drawings and abstract is incorporated herein by reference in its entirety.

BACKGROUND

1. Technical Field

The disclosure relates to a driving support device that supports driving of a vehicle using information on surrounding conditions of the vehicle (a host vehicle).

2. Description of Related Art

A driving support device that detects vehicle-surroundings information on the surrounding circumstances (lane-defining lines and other vehicles) of a vehicle based on information from a "camera and a sensor" mounted in the vehicle and changes a steering angle such that the vehicle travels at an appropriate position in a "travel lane (traveling lane) which is defined by the lane-defining lines" based on the vehicle-surroundings information is known.

A protective window (a window portion) that protects a detection surface of an onboard camera is often provided on the detection surface side. When contamination such as water droplets, cloudiness, traces of water droplets, and mud is attached to the protective window, there is concern that the surrounding circumstances of a vehicle may not be accurately detected. Therefore, a certain device may perform a cleaning process of cleaning a protective window by spraying a cleaning fluid (and/or air) onto a protective window of a camera (for example, see Japanese Unexamined Patent Application Publication No. 2015-231765 (JP 2015-231765 A)).

SUMMARY

This device performs a cleaning process when contamination on a protective window is detected and/or when a driver wants to perform a cleaning process and presses a cleaning switch. However, when this cleaning process is performed during execution of steering support control, the camera may not temporarily be able to detect vehicle-surroundings information. Accordingly, since steering support control may become destabilized, for example, there is a likelihood that a position of the vehicle will deviate greatly from an appropriate position in the travel lane. This problem also occurs similarly in a case in which vehicle-surroundings information is detected using a radar sensor and the vehicle-surroundings information is used for steering support control. As a result, there is demand for performing a cleaning process in a state in which steering support control is not greatly affected.

The disclosure provides a driving support device that can prevent steering support control from becoming destabilized due to execution of a cleaning process in a specific situation (mode) of steering support control.

According to an aspect of the disclosure, there is provided a driving support device including: a first detection unit configured to detect vehicle-surroundings information on vehicle-surroundings circumstances using light or radio waves passing through a window portion; a second detection unit configured to detect state information of a driver on the driver's state; an electric control unit configured to perform steering support control to change a steering angle of a vehicle such that the vehicle travels along a target traveling line which is set based on the vehicle-surroundings information; and a cleaning device configured to preform to clean by spraying at least one of a cleaning fluid and air onto the window portion when a cleaning request is issued.

The electric control unit is configured to select at least one mode of a first mode in which first steering support control which is one steering support control based on a premise that the driver is touching a steering wheel is executed and a second mode in which second steering support control which is another steering support control not based on the premise that the driver is touching the steering wheel is executed based on the vehicle-surroundings information and to operate in the selected mode.

In this way, the electric control unit operates in the first mode in which the first steering support control is executed or operates in the second mode in which the second steering support control is executed. The electric control unit may execute the steering support control in a third mode other than the first mode and the second mode.

The first steering support control which is executed in the first mode is control which is executed, for example, when a reliability of the target traveling line is relatively low and thus is based on a premise that the driver is touching the steering wheel. Accordingly, even when a position of a vehicle has deviated greatly from an appropriate position in a travel lane during execution of the first steering support control, the driver can "correct the position of the vehicle by immediately operating the steering wheel."

On the other hand, the second steering support control which is executed in the second mode is control which is executed, for example, when the reliability of the target traveling line is relatively high and thus is not based on the premise that the driver is touching the steering wheel. In other words, there is a high likelihood that the driver will not be touching the steering wheel when the electric control unit operates in the second mode. Accordingly, when accuracy of the vehicle-surroundings information is decreased due to the cleaning process during execution of the second steering support control and thus the position of the vehicle has deviated greatly from an appropriate position due to the target traveling line becoming inappropriate as a result, there is a likelihood that the driver will not be able to immediately correct the position of the vehicle.

The electric control unit is configured to permit cleaning of the cleaning device when a cleaning request is issued during execution of the steering support control and the mode of the steering support control is the first mode and to prohibit cleaning of the cleaning device when a cleaning request is issued during execution of the steering support control and the mode of the steering support control is the second mode.

Accordingly, the driving support device prohibits execution of the cleaning process by the cleaning device when the mode of the steering support control is the second mode and permits execution of the cleaning process by the cleaning device when the mode of the steering support control is the first mode. As a result, the steering support device can reduce a likelihood that a "state in which a position of a vehicle has deviated greatly from an appropriate position due to the cleaning process which is performed during execution of steering support control" will be maintained for a long time.

In the aspect, the electric control unit may be configured to determine whether the driver is touching the steering wheel based on the state information of the driver when the mode of the steering support control is the first mode and the cleaning request is issued and to cause the cleaning device to perform cleaning when it is determined that the driver is touching the steering wheel.

According to this configuration, when the mode of the steering support control is the first mode and the driver is touching the steering wheel, the cleaning process is performed. Accordingly, even when the position of the vehicle has deviated from an appropriate position in a travel lane while performing the cleaning process, the driver can immediately correct the position of the vehicle by immediately operating the steering wheel.

In the aspect, the electric control unit may be configured to switch the mode of the steering support control from the second mode to the first mode when the mode of the steering support control is the second mode and the cleaning request is issued.

When the mode of the steering support control is the second mode and a cleaning request is issued, the electric control unit switches the mode of the steering support control from the second mode to the first mode and thus it is possible to perform the cleaning process while continuously executing the steering support control.

In the aspect, the electric control unit may be configured to calculate and store a steering control value for causing the vehicle travels along the target traveling line whenever a predetermined time elapses in a period other than a cleaning period from a time point at which cleaning of the cleaning device is started to a time point at which the cleaning is ended when the mode of the steering support control is the first mode and to change the steering angle of the vehicle based on the steering control value. The electric control unit may be configured to change the steering angle of the vehicle based on the steering control value stored immediately before the time point at which the cleaning is started in the cleaning period.

Even when the electric control unit operates in the first mode, there is a high likelihood that accurate vehicle-surroundings information will not be able to be acquired from the first detection unit in the period (the cleaning period) from the time point at which the cleaning process is started to the time point at which the cleaning process is ended. Accordingly, there is a likelihood that an appropriate steering control value for the first steering support control will not be able to be acquired and thus there is a likelihood that the position of the vehicle will deviate greatly from an appropriate position in the travel lane. On the other hand, the electric control unit having the above-mentioned configuration changes the steering angle of the vehicle based on the steering control value stored in the storage unit immediately before the cleaning process is started in the cleaning period. Accordingly, it is possible to decrease the likelihood that the position of the vehicle will deviate greatly from an appropriate position in the travel lane while performing the cleaning process. Even when the position of the vehicle deviates greatly from an appropriate position in the travel lane, the driver can immediately correct the position of the vehicle by immediately operating the steering wheel.

Other features of the disclosure will become apparent from description of this specification and the accompanying drawings. Objectives, configurations, and advantages other than those described above will become clear from the following description in embodiments.

In the above description, names and/or reference signs which are used in the following embodiments are added in parenthesis to elements of the disclosure corresponding to the embodiments for the purpose of easy understanding of the disclosure. However, the elements of the disclosure are not limited to the embodiments which are defined by these names and/or the reference signs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. The accompanying drawings illustrate specific embodiments based on the principle of the disclosure, but they are only examples for understanding the disclosure and should not be used to definitively construe the disclosure.

Configuration

A driving support device according to an embodiment of the disclosure (hereinafter also referred to as "this embodied device") is applied to a vehicle (an automobile). A vehicle to which this embodied device is applied may be referred to as a "host vehicle" for the purpose of distinction from other vehicles.

Figure 1:
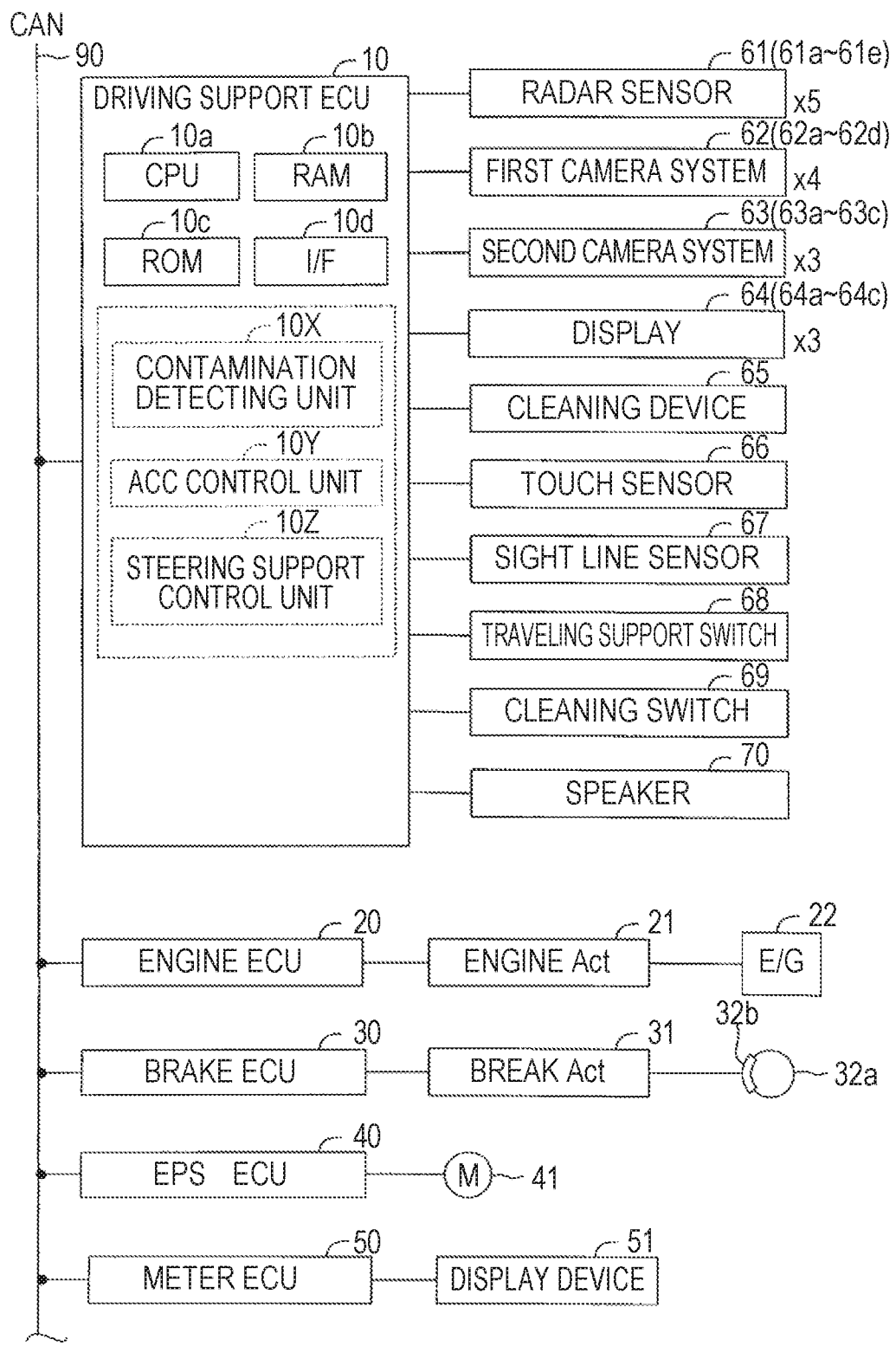
FIG. 1 is a diagram schematically illustrating a configuration of a driving support device according to an embodiment of the disclosure.

As illustrated in FIG. 1, this embodied device includes a driving support ECU 10 including a microcomputer as a principal part. The microcomputer includes a CPU 10a, a RAM 10b, a ROM 10c, and an interface (I/F) 10d. The CPU 10a is configured to embody various functions by executing instructions (programs, routines) stored in the ROM 10c. In this specification, the ECU refers to an electric control unit. The ECU includes a microcomputer including a CPU, a RAM, a ROM, and an interface. The CPU is configured to embody various functions by executing instructions stored in the ROM.

This embodied device includes an engine ECU 20, a brake ECU 30, an electric power steering ECU (hereinafter referred to as an "EPS ECU") 40, and a meter ECU 50. These ECUs and the driving support ECU 10 are connected to each other to transmit and receive information via a controller area network (CAN) 90. Accordingly, detection values of sensors connected to a specific ECU are also transmitted to the other ECUs.

The engine ECU 20 is connected to an engine actuator 21. The engine actuator 21 includes a throttle valve actuator that changes a degree of opening of a throttle valve of an internal combustion engine 22. The engine ECU 20 can change a torque which is generated by the internal combustion engine 22 by driving the engine actuator 21. Accordingly, the engine ECU 20 can control a driving force of a vehicle by controlling the engine actuator 21. When the vehicle is a hybrid vehicle, the engine ECU 20 can control a driving force of the vehicle which is generated by one or both of an "internal combustion engine and an electric motor" serving as vehicle driving sources. When the vehicle is an electric vehicle, the engine ECU 20 can control a driving force of the vehicle which is generated by an electric motor serving as a vehicle driving source.

The brake ECU 30 is connected to a brake actuator 31. The brake actuator 31 adjusts a hydraulic pressure which is supplied to a wheel cylinder built in a brake caliper 32b in accordance with an instruction from the brake ECU 30 and presses a brake pad against a brake disc 32a using the hydraulic pressure to generate a frictional braking force. Accordingly, the brake ECU 30 can control a braking force of the vehicle by controlling the brake actuator 31.

The EPS ECU 40 is connected to an assist motor (M) 41. The assist motor 41 is incorporated into a "steering mechanism including a steering wheel, a steering shaft connected to the steering wheel, and a steering gear mechanism" of the vehicle. The EPS ECU 40 detects a steering torque which is input to the steering wheel by a driver using a steering torque sensor (not illustrated) disposed in the steering shaft and drives the assist motor 41 in accordance with the steering torque. The EPS ECU 40 applies a steering torque (a steering assist torque) to the steering mechanism by driving the assist motor 41 and thus can assist a steering operation of the driver.

When a steering command is received from the driving support ECU 10 via the CAN 90 during execution of driving support control which will be described later, the EPS ECU 40 drives the assist motor 41 in accordance with a steering control value which is identified by the steering command. The steering control value is a parameter (for example, a target steering angle) for determining a steering angle of the vehicle. Accordingly, a turning angle (that is, a steering angle) of turning wheels of the vehicle is changed (the turning wheels are turned).

The meter ECU 50 is connected to a display device 51. The display device 51 is a multi-information display which is disposed in front of a driver's seat. The display device 51 displays a variety of information in addition to measured values of a vehicle speed, an engine rotation speed, and the like. The meter ECU 50 displays information on driving support control (for example, a mode of driving support control and a status of a cleaning process) in accordance with a display command transmitted from the driving support ECU 10. The display device 51 is not limited to a multi-information display. A head-up display may be employed as the display device 51.

The driving support ECU 10 is connected to a plurality of radar sensors 61a to 61e, a plurality of first camera systems 62a to 62d, a plurality of second camera systems 63a to 63c, a plurality of displays 64a to 64c, a cleaning device 65, a touch sensor 66, a sight line sensor 67, a traveling support switch 68, a cleaning switch 69, and a speaker 70. The plurality of radar sensors 61a to 61e are collectively referred to as a "radar sensor 61." The plurality of first camera systems 62a to 62d are collectively referred to as a "first camera system 62." The plurality of second camera systems 63a to 63c are collectively referred to as a "second camera system 63." The plurality of displays 64a to 64c are collectively referred to as a "display 64."

The radar sensor 61 includes a radar transmitting and receiving unit and a signal processing unit (both of which are not illustrated). The radar transmitting and receiving unit transmits radio waves of a millimeter band (hereinafter referred to as "millimeter waves") and receives millimeter waves (that is, reflected waves) which are reflected by an object in an emission range. The signal processing unit acquires information indicating whether there is an object and a relative relationship between a host vehicle and an object (that is, a distance between the host vehicle and the object, a direction to the object, and a relative speed between the host vehicle and the object) based on a phase difference between the transmitted millimeter waves and the received reflected waves, an attenuation level of the reflected waves, a time from a time point at which millimeter waves have been transmitted to a time point at which reflected waves have been received, and the like, and outputs the acquired information to the driving support ECU 10. Information indicating a relative relationship between the host vehicle and the object is referred to as "object information."

Figure 2:
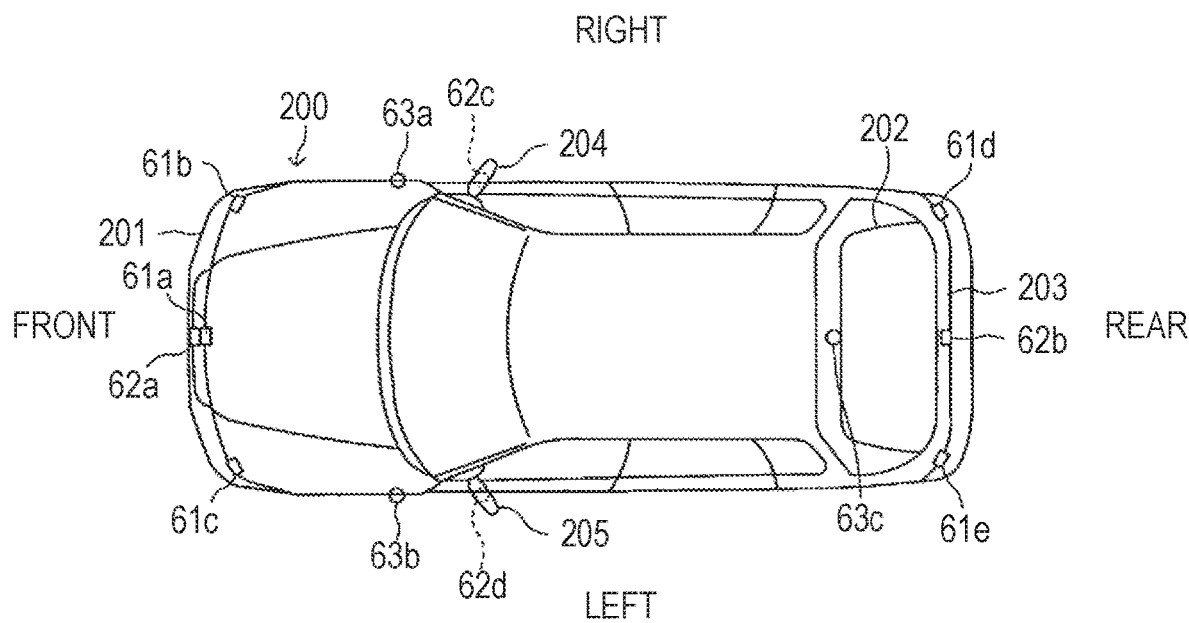
FIG. 2 is a plan view of a vehicle illustrating arrangement of a radar sensor, a first camera system, and a second camera system.

As illustrated in FIG. 2, the radar sensor 61a is disposed at the center of a front portion of a vehicle body 200 and mainly detects an object which is present in an area in front of the host vehicle. The radar sensor 61b is disposed at the right corner of the front portion of the vehicle body 200 and mainly detects an object which is present in an area to the right in front of the host vehicle. The radar sensor 61c is disposed at the left corner of the front portion of the vehicle body 200 and mainly detects an object which is present in an area to the left in front of the host vehicle. The radar sensor 61d is disposed at the right corner of the rear portion of the vehicle body 200 and mainly detects an object which is present in an area to the right in the rear of the host vehicle. The radar sensor 61e is disposed at the left corner of the rear portion of the vehicle body 200 and mainly detects an object which is present in an area to the left in the rear of the host vehicle.

The first camera system 62 illustrated in FIG. 1 includes a camera and an image processing unit (both of which are not illustrated). The camera captures an image of the scenery around the host vehicle and acquires (generates) image data. The image processing unit acquires object information based on the acquired image data. The first camera system 62 outputs the object information to the driving support ECU 10. In this case, the driving support ECU 10 acquires combined object information (parameters indicating the relative relationship between the host vehicle and the object) by combining the object information acquired by the radar sensor 61 and the object information acquired by the first camera system 62.

The first camera system 62 recognizes right and left lane-defining lines (white lines) of a road based on the acquired image data, calculates "lane information" including a "road shape and a positional relationship between a road and the host vehicle (for example, a distance from the right end or the left end of a lane in which the host vehicle is traveling to the central position in the vehicle width direction of the host vehicle)" based on the recognized lane-defining lines, and outputs the calculated lane information to the driving support ECU 10.

As illustrated in FIG. 2, the first camera system 62a is disposed at substantially a central portion in the vehicle width direction of a front bumper 201 and acquires image data in front of the vehicle. The first camera system 62b is disposed in a wall portion of a rear trunk 203 in the rear of the vehicle body 200 and acquires image data in the rear of the vehicle. The first camera system 62c is disposed in a right door mirror 204 and acquires image data to the right of the vehicle. The first camera system 62d is disposed in a left door mirror 205 and acquires image data to the left of the vehicle.

As described above, the driving support ECU 10 acquires information on surrounding circumstances of the vehicle including the "object information and the lane information" from the radar sensor 61 and the first camera system 62 as "vehicle-surroundings information." The radar sensor 61 and the first camera system 62 may be referred to as a "first detection unit that detects vehicle-surroundings information (a first detection unit)" together.

The second camera system 63 illustrated in FIG. 1 is a camera system for an electronic mirror and includes a camera and an image processing unit (both of which are not illustrated). The camera captures an image of the scenery around the host vehicle and acquires (generates) image data. The image processing unit cuts out "image data in an area corresponding to an area which can be seen with a general door mirror" from the acquired image data. The second camera system 63 outputs the cut-out image data to the driving support ECU 10.

As illustrated in FIG. 2, the second camera system 63a is disposed in a right fender portion and acquires image data for an image to the right in the rear of the vehicle. The second camera system 63b is disposed in a left fender portion and acquires image data for an image to the left in the rear of the vehicle. The second camera system 63c is disposed around an upper portion of a rear glass window 202 and acquires image data for an image to the rear of the vehicle.

Figure 3:
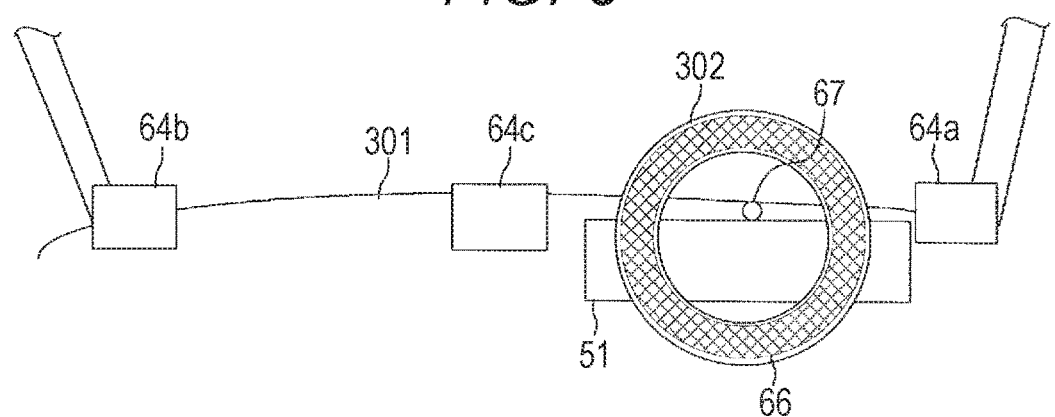
FIG. 3 is a diagram schematically illustrating a configuration of a dashboard and a steering wheel in a passenger compartment according to an embodiment of the disclosure.

The display 64 illustrated in FIG. 1 is a display for an electronic mirror and is a display that displays image data acquired by the second camera system 63. As illustrated in FIG. 3, the display 64a is disposed at a position of a right end of a dashboard 301 in the passenger compartment, the display 64b is disposed at a position of a left end of the dashboard 301, and the display 64c is disposed at the central position of the dashboard 301. The driving support ECU 10 displays the image data acquired by the second camera system 63a on the display 64a. The driving support ECU 10 displays the image data acquired by the second camera system 63b on the display 64b. The driving support ECU 10 displays the image data acquired by the second camera system 63c on the display 64c. A driver can ascertain objects in the left-rear, the right-rear, and the rear of the vehicle without using a door mirror and a rearview mirror by merely seeing the displays 64a to 64c. A display of a navigation device which is not illustrated may be used as the display for an electronic mirror. In this case, the driving support ECU 10 may divide an area of the display of the navigation device into three areas and display the image data of the second camera systems 63a to 63c in the divided areas.

The cleaning device 65 illustrated in FIG. 1 cleans "protective windows of the radar sensor 61, the first camera system 62, and the second camera system 63 which will be described later (see 411a to 411l in FIG. 4)" by spraying mixtures of a cleaning fluid and compressed air onto the protective windows. Cleaning of a protective window is also referred to as "performing a cleaning process." The protective window is also referred to as a "window portion." Accordingly, the radar sensor 61 detects object information using radio waves (millimeter waves) passing through the corresponding window portion. The first camera system 62 acquires object information and lane information using light passing through the corresponding window portion. The cleaning device 65 performs a cleaning process by activating an "electric air pump 504, an electromagnetic ON-OFF valve 503, and a cleaning fluid pump 402" which will be described later in accordance with a command (a cleaning command signal) from the driving support ECU 10.

The touch sensor 66 illustrated in FIG. 1 is disposed in a grip portion of the steering wheel 302 as illustrated in FIG. 3. The touch sensor 66 outputs a signal indicating whether a driver's hand is touching the steering wheel 302 to the driving support ECU 10. Specifically, the touch sensor 66 outputs an ON signal when a driver's hand is put on (is touching) the steering wheel 302 and outputs an OFF signal when a driver's hand is separated from (is not touching) the steering wheel 302. The driving support ECU 10 determines whether a driver's hand is touching the steering wheel 302 based on a signal from the touch sensor 66.

The sight line sensor 67 illustrated in FIG. 1 is disposed at a position around a driver seat on the dashboard 301 as illustrated in FIG. 3. A detection surface of the sight line sensor 67 faces the driver seat. The sight line sensor 67 detects a line of sight of a driver. Specifically, the sight line sensor 67 includes a camera (not illustrated). The sight line sensor 67 captures an image of a driver's face using the camera and generates face image data. The driving support ECU 10 acquires the face image data from the sight line sensor 67 and acquires sight line data indicating an estimated direction of a line of sight by estimating the direction of the line of sight of the driver from pupillary reflection of the driver based on the face image data. The value of the sight line data is, for example, information of an angle of a sight line (a sight line angle in the horizontal direction and a sight line angle in the vertical direction) indicating by what angle the sight line direction rotates in the horizontal direction and the vertical direction with a state when a driver sees the front on the driver seat as a reference.

In this way, the driving support ECU 10 acquires information on whether a "driver's hand is touching the steering wheel 302 and information on the sight line direction of the driver" (hereinafter, this information on the state of the driver may be referred to as "state information of the driver") based on the information from the touch sensor 66 and the sight line sensor 67. The touch sensor 66 and the sight line sensor 67 may be referred to as a "second detection unit (a second detection unit) that detects state information of a driver" together.

The traveling support switch 68 illustrated in FIG. 1 is a switch which is operated by a driver. A driver can select whether to execute following inter-vehicle distance control which will be described later by operating the traveling support switch 68. A driver can select whether to execute lane keeping control (steering support control) which will be described later by operating the traveling support switch 68.

The cleaning switch 69 is a switch which is operated by a driver when the driver requests the driving support ECU 10 to "execute a cleaning process" (when a cleaning request is issued). The cleaning switch 69 generates a signal (a cleaning request signal) indicating a cleaning request when it is operated.

The speaker 70 is disposed on the inner sides (the passenger compartment sides) of right and left front doors (not illustrated) of the vehicle. The speaker 70 can emit sound such as a voice message and a warning sound in accordance with an instruction from the driving support ECU 10.

Figure 4:
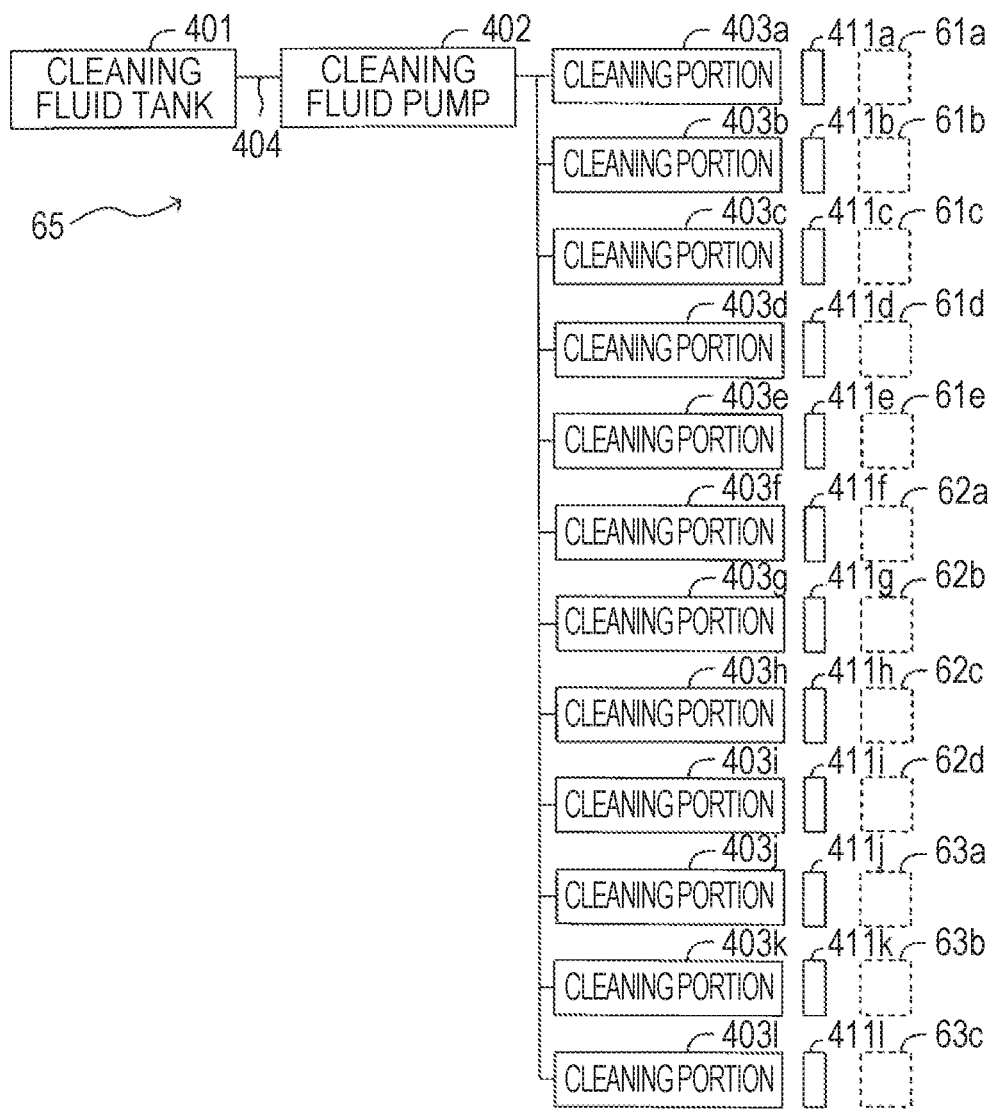
FIG. 4 is a diagram schematically illustrating a configuration of a cleaning device according to the embodiment of the disclosure.

The cleaning device 65 will be described below in more detail. As illustrated in FIG. 4, protective windows 411a to 411l for protecting detection surfaces (sensing surfaces) of the radar sensors 61, the first camera systems 62, and the second camera systems 63 from mud, dust, dirt, and the like are disposed at installation positions thereof. Hereinafter, the protective windows 411a to 411l may be collectively referred to as a "protective window 411." The protective window 411 is a light-transmitting plate member (for example, a window of transparent glass or transparent resin). The detection surface of the radar sensor 61 refers to a surface of a lens that receives reflected waves reflected from an object. The detection surfaces of the first camera system 62 and the second camera system 63 refer to surfaces of lenses that receive light from a subject.

The cleaning device 65 includes a cleaning fluid tank 401, an electric cleaning fluid pump 402, and a plurality of cleaning portions 403a to 403l. The cleaning fluid tank 401 and the plurality of cleaning portions 403a to 403l are connected by pipes 404. The electric cleaning fluid pump 402 is disposed between the cleaning fluid tank 401 and the plurality of cleaning portions 403a to 403l in the pipes 404.

A cleaning fluid is stored in the cleaning fluid tank 401. In this example, the cleaning fluid is water. The cleaning fluid may be a liquid including alcohol for prevention of a freeze or may be a liquid including a detergent. When the electric cleaning fluid pump 402 is activated, the electric cleaning fluid pump 402 pumps the cleaning fluid stored in the cleaning fluid tank 401 and feeds (supplies) the cleaning fluid to the plurality of cleaning portions 403a to 403l. The electric cleaning fluid pump 402 activates or stops itself in accordance with a command from the driving support ECU 10.

The plurality of cleaning portions 403a to 403l have the same configuration. Therefore, in the following description, the cleaning portion 403a will be described and detailed description of the other cleaning portions 403b to 403l will not be repeated.

Figure 5A:
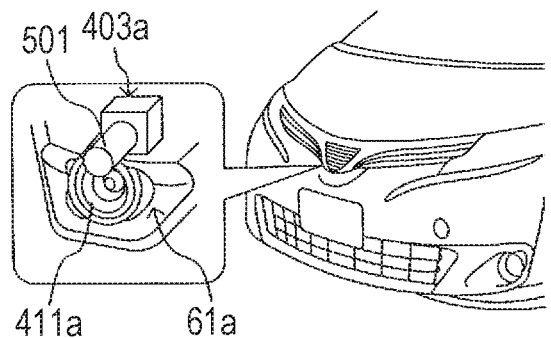
FIG. 5A is an enlarged perspective view of a radar sensor and a cleaning portion which are attached to a front of a vehicle.
Figure 5B:
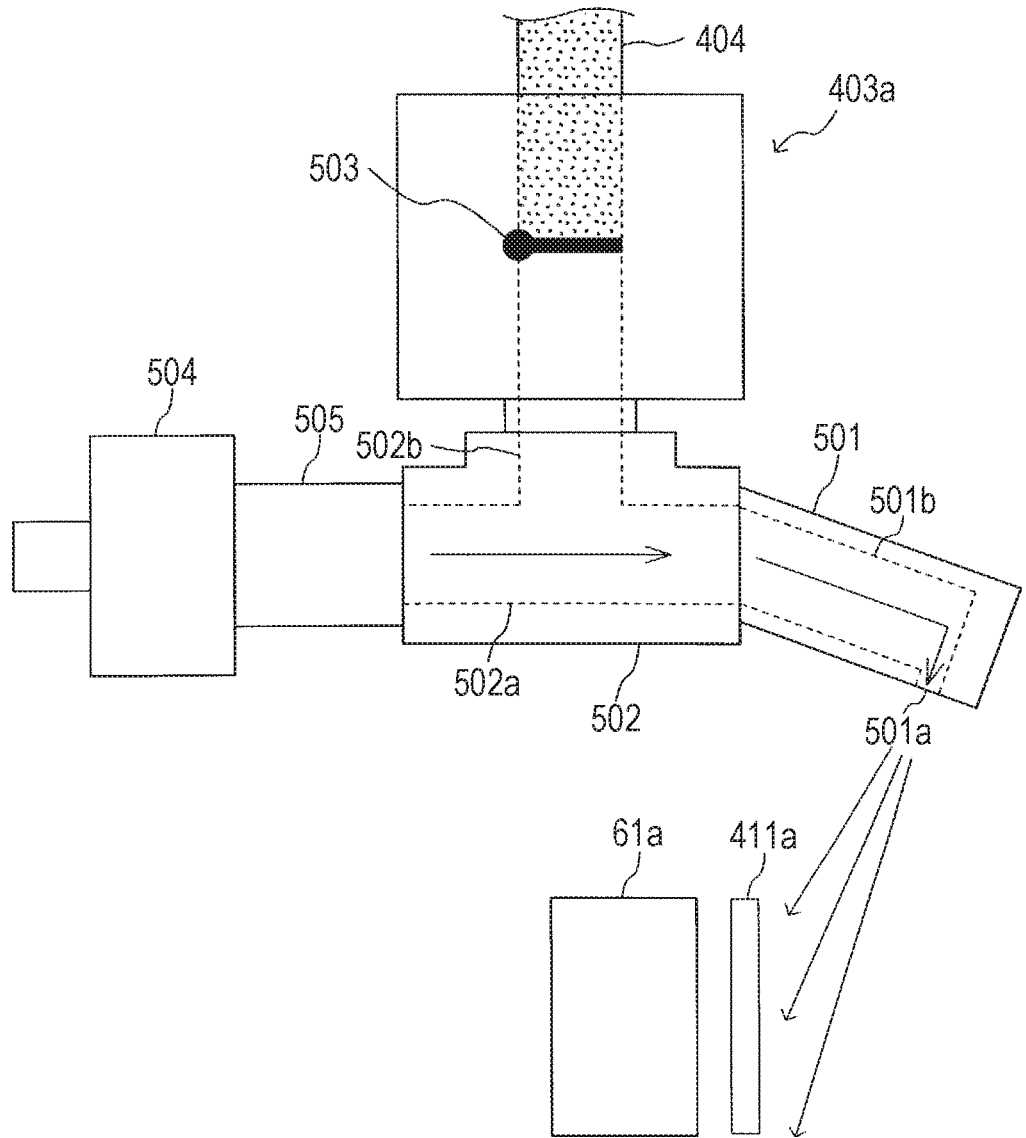
FIG. 5B is a schematic configuration diagram of the cleaning portion illustrated in FIG. 5A.

As illustrated in FIGS. 5A and 5B, the cleaning portion 403a includes a nozzle portion 501, a junction joint 502, an electromagnetic ON-OFF valve 503, an electric air pump 504, and a pipe 505.

When a cleaning process is performed, the driving support ECU 10 activates the electric air pump 504, opens the electromagnetic ON-OFF valve 503, and activates the electric cleaning fluid pump 402 (see FIG. 4). As a result, compressed air flows into a flow passage 502a in the junction joint 502 via the pipe 505. The cleaning fluid flows into the flow passage 502a from the pipe 404 via a flow passage 502b. Accordingly, the cleaning fluid and the compressed air are mixed in the flow passage 502a, and a mixture in which the cleaning fluid and the compressed air are mixed passes through a flow passage 501b in the nozzle portion 501 and is then sprayed from a spray port 501a onto the protective window 411a.

When a cleaning process is not performed, the driving support ECU 10 stops the electric air pump 504, closes the electromagnetic ON-OFF valve 503, and stops the electric cleaning fluid pump 402 (see FIG. 4). As a result, none of the compressed air and the cleaning fluid is supplied to the spray port 501a.

The driving support ECU 10 performs a cleaning process when a cleaning request is issued as described above. A cleaning request is issued when the cleaning switch 69 is operated by a driver and when contamination is detected from at least one of the protective windows 411a to 411l.

In this embodiment, when a cleaning request is issued, the driving support ECU 10 performs a cleaning process on all the protective windows 411. This is because when contamination is detected from one of the protective windows 411, there is a likelihood that the other protective windows have been contaminated for the reason why the other protective windows are exposed to the same environment.

In this embodiment, statins of the protective windows 411j to 411l corresponding to the second camera systems 63 do not affect lane keeping control (steering support control). However, since the protective windows 411a to 411i corresponding to the radar sensors 61 and the first camera systems 62 are also exposed to the same environment, there is a likelihood that the protective windows 411a to 411i have been contaminated when contamination of the protective windows 411j to 411l is detected. Since a driver sees the screen of the display 64 for an electronic mirror, the driver determines that the protective windows 411j to 411l are contaminated from the screen and operates the cleaning switch 69. Accordingly, when contamination of the protective windows 411j to 411l corresponding to the second camera systems 63 is detected and thus a cleaning request is issued and when a cleaning request is issued by operating the cleaning switch 69, the driving support ECU 10 performs a cleaning process on all the protective windows 411.

A method of detecting contamination of a protective window will be described below in brief. Contamination of the protective window corresponding to the radar sensor 61 can be detected using one of various existing methods (for example, see Japanese Unexamined Patent Application Publication No. 2003-320866 (JP 2003-320866 A)). For example, the driving support ECU 10 acquires an intensity of reflected waves (hereinafter referred to as a "reflection intensity") of the radar sensor 61. Specifically, the driving support ECU 10 calculates a frequency spectrum of a received signal from the radar sensor 61 and calculates the magnitude of a peak appearing in the frequency spectrum as reflection intensity. When the reflection intensity is less than a predetermined threshold value, the driving support ECU 10 determines that the protective window corresponding to the radar sensor 61 has been contaminated and issues a cleaning request.

Contamination of the protective windows corresponding to the camera systems 62 and 63 can be detected using one of various existing methods (for example, see Japanese Unexamined Patent Application Publication No. 2008-060874 (JP 2008-060874 A)). For example, the driving support ECU 10 acquires image data acquired by a specific camera system at two continuous calculation times and estimates an optical flow at a next calculation time using the acquired image data. An optical flow is a vector indicating in what direction and by what distance a point in an image moves at a next instance. The driving support ECU 10 compares the estimated optical flow with an actual optical flow at a next calculation time. When the estimated optical flow and the actual optical flow are greatly different, the driving support ECU 10 determines that the protective window corresponding to the specific camera system has been contaminated and issues a cleaning request.

As described above, the driving support ECU 10 functionally includes a "contamination detecting unit (a contamination detecting unit) 10X that detects contamination of the protective windows of the radar sensor 61, the first camera system 62, and the second camera system 63" and that is embodied by the CPU.

Following Inter-Vehicle Distance Control (ACC)

Driving support control which is executed by the driving support ECU 10 will be described below. Following inter-vehicle distance control which is one type of driving support control is control for causing the host vehicle to follow a preceding vehicle while maintaining an inter-vehicle distance between the preceding vehicle traveling immediately before the host vehicle and the host vehicle at a predetermined distance based on object information. The following inter-vehicle distance control is known well (for example, see Japanese Unexamined Patent Application Publication No. 2014-148293 (JP 2014-148293 A), Japanese Unexamined Patent Application Publication No. 2006-315491 (JP 2006-315491 A), Japanese Patent No. 4172434, and Japanese Patent No. 4929777). Therefore, the following inter-vehicle distance control will be described below in brief.

When following inter-vehicle distance control is requested, the driving support ECU 10 selects a vehicle to be followed based on object information. The driving support ECU 10 calculates target acceleration Gtgt of the host vehicle such that an inter-vehicle distance between the vehicle to be followed and the host vehicle becomes a target inter-vehicle distance Dtgt. The driving support ECU 10 controls the engine actuator 21 using the engine ECU 20 and controls the brake actuator 31 using the brake ECU 30 if necessary such that the acceleration of the host vehicle matches the target acceleration Gtgt.

In this way, the driving support ECU 10 functionally includes an "ACC control unit 10Y that executes following inter-vehicle distance control (ACC)" which is embodied by the CPU.

Lane Keeping Control (Steering Support Control)

When lane keeping control is requested by operation of the traveling support switch 68 during execution of following inter-vehicle distance control, the driving support ECU 10 executes lane keeping control. The lane keeping control is control for executing steering control such that the host vehicle travels at an appropriate position in a "travel lane which is defined by white lines (lane-defining lines) (a travel lane in which the host vehicle is traveling)." Lane keeping control is called as various names such as "lane trace control (LTC) and "traffic jam assist control (TJA)." Since the lane keeping control is well known (for example, see Japanese Unexamined Patent Application Publication No. 2008-195402 (JP 2008-195402 A), Japanese Unexamined Patent Application Publication No. 2009-190464 (JP 2009-190464 A), Japanese Unexamined Patent Application Publication No. 2010-6279 (JP 2010-6279 A), and Japanese Patent No. 4349210), the lane keeping control will be described below in brief.

The driving support ECU 10 determines a target traveling line (a target travel lane) using either white lines or a traveling trace of a preceding vehicle to be followed (also referred to as a "preceding vehicle trace") or both thereof. The target traveling line is, for example, a center line between right and left white lines defining a travel lane in which the host vehicle is traveling. The driving support ECU 10 calculates a steering control value such that a lateral position of the host vehicle (that is, a position of the host vehicle in the vehicle width direction relative to a road) is maintained in the vicinity of the target traveling line. The steering control value is, for example, a target steering angle.

Specifically, after determining the target traveling line, the driving support ECU 10 acquires target travel route information (a curvature CL of the target traveling line, a yaw angle $\theta L$ with respect to the target traveling line, and a lateral deviation dL with respect to the target traveling line) which is required for lane keeping control. Here, the yaw angle $\theta L$ is a deviation angle between the direction of the target traveling line (a tangent direction) and the traveling direction of the host vehicle. The lateral deviation dL is a length by which the host vehicle is shifted in the road width direction from the target traveling line.

The driving support ECU 10 calculates a target steering angle $\theta^*$ by applying the curvature CL, the yaw angle $\theta L$, and the lateral deviation dL to Equation (1) whenever a predetermined time elapses. In Equation (1), Klta1, Klta2, and Klta3 are predetermined control gains.

$$\theta^* = Klta1 \cdot CL + Klta2 \cdot \theta L + Klta3 \cdot dL \qquad (1)$$

The driving support ECU 10 drives the assist motor 41 by transmitting a steering command for specifying the steering control value (the target steering angle $\theta^*$) to the EPS ECU 40. As a result, an actual steering angle $\theta$ of the vehicle matches the target steering angle $\theta^*$.

In this way, the driving support ECU 10 functionally includes a "steering support control unit (a steering support control unit) 10Z that executes steering support control for performing steering support for causing a vehicle to travel along a target traveling line" and which is embodied by the CPU.

The driving support ECU 10 executes steering support control in one mode of a first mode in which first steering support control based on a premise that a driver is touching the steering wheel 302 and the driver sees the front of the vehicle (hereinafter referred to as a "Hands-ON" state) is executed and a second mode in which second steering support control not based on the premise that a driver is in the "Hands-ON" state is executed. These modes will be described below.

1. First Mode

The driving support ECU 10 selects the first mode when reliability of the target traveling line is lower than that in a case in which second steering support control is executed in the second mode which will be described later (accordingly, when reliability of lane keeping control is lower). The "case in which reliability of the target traveling line is low" in which the first mode is selected is, for example, a case in which following condition A is satisfied:

(Condition A) both of a left white line and a right white line within a first predetermined distance forward from the host vehicle are detected and at least one of the left white line and the right white line over the first predetermined distance forward from the host vehicle is not detected.

When the mode of steering support control is the first mode, the driving support ECU 10 executes the first steering support control. The magnitudes of the "control gains (particularly Klta2 and Klta3) in Equation (1)" which are used in the first steering support control are set to values less than the "control gains (particularly, Klta2 and Klta3) in Equation (1)" which are used in the second steering support control in the second mode. Accordingly, responsiveness of lane keeping control in the first mode is lower than responsiveness of lane keeping control in the second mode. As a result, it is possible to prevent rapid change of the position and the direction of the host vehicle.

When the mode of steering support control is the first mode, the driving support ECU 10 requests a driver to be in the "Hands-ON" state. In other words, the first mode is a mode in which the first steering support control based on a premise that a driver is in the "Hands-ON" state is executed. The driving support ECU 10 monitors (determines) whether a driver is in the "Hands-ON" state based on the state information of the driver. For example, the driving support ECU 10 determines that the driver is in the "Hands-ON" state when all of following conditions B1 to B3 are satisfied:
Condition 1: a signal from the touch sensor 66 is an ON signal;
Condition B2: the magnitude of a sight line angle in the horizontal direction indicated by the sight line data is equal to or less than a predetermined first angle threshold value; and
Condition B3: the magnitude of a sight line angle in the vertical direction indicated by the sight line data is equal to or less than a predetermined second angle threshold value.

On the other hand, when at least one of Conditions B1 to B3 is not satisfied, the driving support ECU 10 determines that the driver is not in the "Hands-ON" state (the driver is in an "Hands-OFF" state). In this case, the driving support ECU 10 causes the display device 51 to display a warning indicating that determination result and causes the speaker 70 to output details of the warning. When the driving support ECU 10 is operating in the first mode and a state other than the "Hands-ON" state is continuously maintained for a predetermined time or more, the driving support ECU 10 cancels the steering support control (the first steering support control). In this case, the first steering support control which is executed in the first mode is control based on a premise that the driver is in the "Hands-ON" state.

When the driving support ECU 10 is operating in the first mode, there is a high likelihood that the driver is in the "Hands-ON" state. Accordingly, when the lateral position of the host vehicle deviates from an appropriate position, the driver can rapidly correct the lateral position of the host vehicle.

2. Second Mode

When reliability of the target traveling line is higher than that in a case in which the first steering support control is executed in the first mode (accordingly, when a reliability of lane keeping control is higher), the driving support ECU 10 selects the second mode. The "case in which a reliability of the target traveling line is high" and the second mode is selected is, for example, a case in which following Condition C is satisfied:
Condition C: both the left white line and the right white line within a "second predetermined distance longer than the first predetermined distance" forward from the host vehicle are detected.

As described above, the magnitudes of the "control gains (particularly Klta2 and Klta3) in Equation (1)" which are used in the second steering support control are set to values greater than the "control gains (particularly, Klta2 and Klta3) in Equation (1)" which are used in the first steering support control in the first mode. Accordingly, responsiveness of lane keeping control in the second mode is higher than responsiveness of lane keeping control in the first mode. As a result, it is possible to rapidly correct the position and the direction of the host vehicle.

When the mode of steering support control is the second mode, the driving support ECU 10 does not require that the driver is in the "Hands-ON" state. In other words, the second mode is a mode in which the second steering support control not based on the premise that the driver is in the "Hands-ON" state is executed.

Outline of Processing When Cleaning Request is Issued

The operation of the driving support ECU 10 when a cleaning request is issued in a situation in which the driving support ECU 10 is executing lane keeping control (steering support control) will be described below.

As described above, when a cleaning process is performed on the protective windows 411 during execution of lane keeping control (steering support control), the radar sensors 61 and the first camera systems 62 cannot temporarily detect vehicle surroundings. Particularly, when the mode of lane keeping control is the second mode, the responsiveness of lane keeping control is higher than that in the case in which the mode of lane keeping control is the first mode. Accordingly, when the mode of lane keeping control is the second mode and the cleaning process is performed, there is a likelihood that lane keeping control will be destabilized. That is, there is a likelihood that the position of the vehicle will deviate greatly from an appropriate position in the travel lane. When the mode of lane keeping control is the second mode, there is a high likelihood that the driver will not be in the "Hands-ON" state. Accordingly, when the lateral position of the host vehicle deviates from an appropriate position, the driver may not rapidly correct the lateral position of the host vehicle by operation of the steering wheel.

Therefore, when a cleaning request is issued during execution of lane keeping control, the driving support ECU 10 permits the cleaning device 65 to perform the cleaning process when the mode of lane keeping control is the first mode (that is, when the first steering support control is being executed) and prohibits the cleaning device 65 from executing the cleaning process when the mode of lane keeping control is the second mode (that is, when the second steering support control is being executed). Accordingly, it is possible to decrease a likelihood that a state in which the position of the vehicle has deviated greatly from an appropriate position in the travel lane is maintained for a long time.

When the mode of lane keeping control is the first mode and a cleaning request is issued, the driving support ECU 10 causes the cleaning device 65 to perform a cleaning process in a situation in which the driver is in the "Hands-ON" state. Accordingly, even when the position (the lateral position) of the vehicle deviates from an appropriate position in the travel lane during execution of the cleaning process, a driver can immediately correct the position of the vehicle by operating the steering wheel 302.

When the mode of lane keeping control is the second mode and a cleaning request is issued, the driving support ECU 10 switches the mode of lane keeping control from the second mode to the first mode. Accordingly, it is possible to perform the cleaning process while continuously executing lane keeping control.

When the driving support ECU 10 is operating in the first mode, the driving support ECU 10 stores a steering control value in the RAM whenever the steering control value is calculated. The driving support ECU 10 controls the steering angle of the vehicle based on the steering control value stored in the RAM immediately before the cleaning process is started in a period from a time point at which the cleaning process is started to a time point at which the cleaning process is ended. This is because there is a likelihood that accurate vehicle-surroundings information will not be able to be acquired from the radar sensors 61 and the first camera systems 62 when the protective windows 411 are being cleaned and thus there is a likelihood that an appropriate steering control value will not be able to be calculated. It is possible to prevent the position of the vehicle from deviating greatly from an appropriate position in the travel lane during execution of the cleaning process by using the steering control value which is calculated at a calculation time immediately before the cleaning process is started.

Detailed Operation

Figure 6:
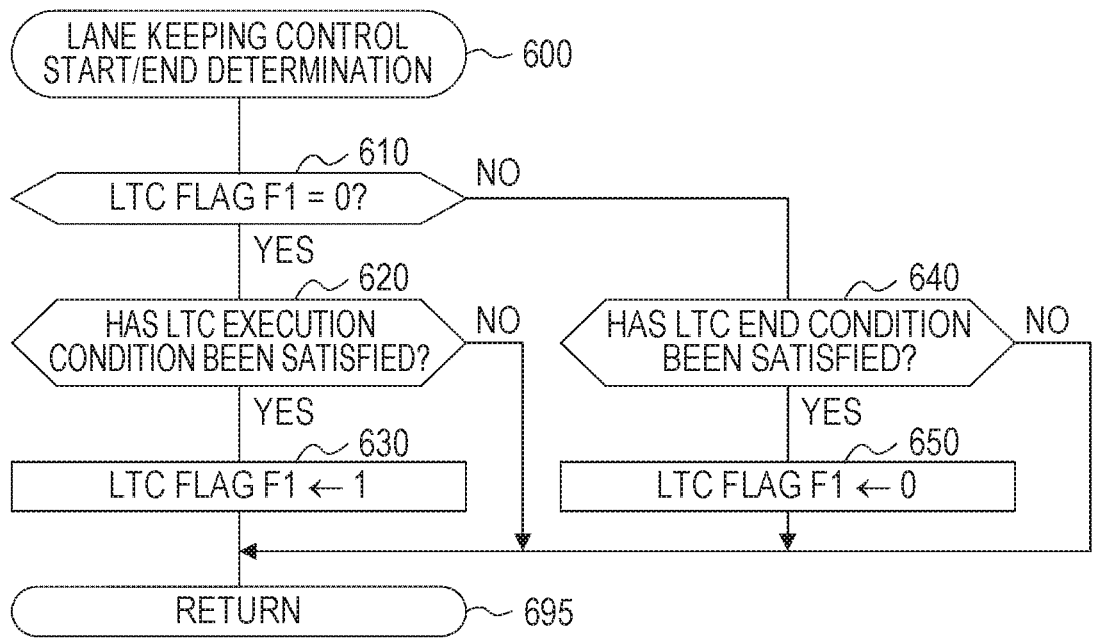
FIG. 6 is a flowchart illustrating a "lane keeping control start/end determining routine" which is performed by a driving support ECU according to the embodiment of the disclosure.

The detailed operation of a CPU 10a of the driving support ECU 10 (may be simply referred to as a "CPU") will be described below. The CPU performs a "lane keeping control (steering support control) start/end determining routine" which is illustrated in the flowchart of FIG. 6 whenever a predetermined time elapses. The CPU executes following inter-vehicle distance control (ACC) through a routine which is not illustrated.

By performing a routine which is not illustrated whenever a predetermined time elapses, the CPU acquires vehicle-surroundings information using information from the radar sensors 61 and the first camera systems 62 and stores the acquired vehicle-surroundings information in the RAM as described above. By performing a routine which is not illustrated whenever a predetermined time elapses, the CPU acquires state information of a driver from the touch sensor 66 and the sight line sensor 67 and stores the acquired state information of a driver in the RAM as described above.

Accordingly, at a predetermined time, the CPU starts the routine illustrated in FIG. 6 from Step 600 and determines whether an LTC flag F1 is "0" in Step 610. The LTC flag F1 indicates that lane keeping control (one of the first steering support control and the second steering support control) is executed when the value there of is "1" and indicates that lane keeping control is not executed when the value thereof is "0." The LTC flag F1 is also referred to as a lane keeping control execution flag. The value of the LTC flag F1 is set to "0" in an initialization routine which is performed by the CPU when an ignition switch which is not illustrated is switched from an OFF position to an ON position. The value of the LTC flag F1 is also set to "0" in Step 960 in FIG. 9 which will be described later.

Here, when it is assumed that the value of the LTC flag F1 is "0" (lane keeping control is not executed), the CPU determines "YES" in Step 610 and determines whether a predetermined LTC execution condition (a lane keeping control execution condition) is satisfied in Step 620.

The LTC execution condition is satisfied when all of following Conditions 1 to 3 are satisfied:
Condition 1: following inter-vehicle distance control is being executed and execution of lane keeping control is selected by operating the traveling support switch 68;
Condition 2: the left white line and the right white line within at least a predetermined distance forward from the host vehicle are recognized by the first camera systems 62; and
Condition 3: a driver is in the "Hands-ON" state.

Condition 2 may be replaced with the following condition:
the left white line and the right white line within at least the predetermined distance forward from the host vehicle are recognized by the first camera systems 62 or there is a steering-following preceding vehicle.

When the LTC execution condition is not satisfied, the CPU determines "NO" in Step 620 and temporarily ends this routine in Step 695.

On the other hand, when the LTC execution condition is satisfied, the CPU determines "YES in Step 620 and performs the process of Step 630. The CPU sets the LTC flag F1 to "1" in Step 630 and temporarily ends this routine in Step 695. As a result, steering support control is executed (see the determination of "YES" in Step 810 in FIG. 8).

On the other hand, when the value of the LTC flag F1 is "1" (lane keeping control is being executed) at a time point at which the CPU performs the process of Step 610, the CPU determines "NO" in Step 610 and determines whether a predetermined LTC end condition (a lane keeping condition end condition) is satisfied in Step 640.

The LTC end condition is satisfied when at least one of following Conditions 4 to 6 is satisfied:
Condition 4: the following inter-vehicle distance control is ended;
Condition 5: it is selected that execution of lane keeping control is ended by operating the traveling support switch 68; and
Condition 6: None of the left white line and the right white line can be recognized by the first camera systems 62. That is, information required for lane keeping control cannot be acquired.

Condition 6 may be the following condition: a steering following preceding vehicle is not present in front of the host vehicle and none of the left white line and the right white line can be recognized by the first camera systems 62.

When the LTC end condition is not satisfied, the CPU determines "NO" in Step 640 and temporarily ends this routine in Step 695. On the other hand, when the LTC end condition is satisfied, the CPU determines "YES" in Step 640 and performs the process of Step 650. In Step 650, the CPU sets the LTC flag F1 to "0" and temporarily ends this routine in Step 695. As a result, the steering support control is stopped (see the determination of "NO" in Step 810 in FIG. 8).

Figure 7:
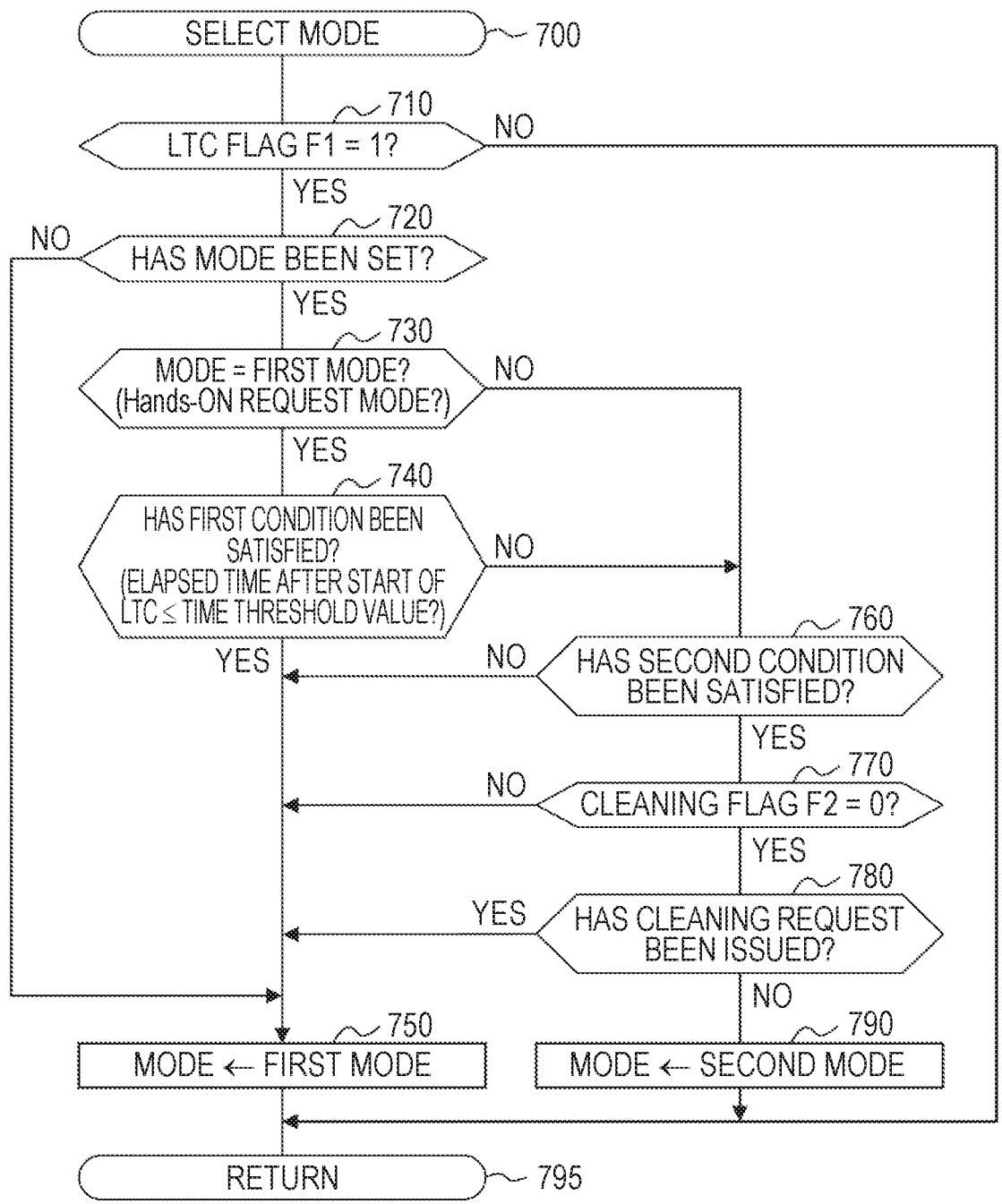
FIG. 7 is a flowchart illustrating a "mode selecting routine" which is performed by the driving support ECU according to the embodiment of the disclosure.

The CPU performs a mode selecting routine illustrated in the flowchart illustrated in FIG. 7 whenever a predetermined time elapses.

Accordingly, at a predetermined time, the CPU starts the routine from Step 700 in FIG. 7 and determines whether the value of the LTC flag F1 is "1" in Step 710. When the value of the LTC flag F1 is not "1," the CPU determines "NO" in Step 710 and temporarily ends this routine in Step 795.

On the other hand, when the value of the LTC flag F1 is "1," the CPU determines "YES" in Step 710 and determines whether the mode of lane keeping control is currently set in Step 720.

Here, it is assumed that the value of the LTC flag F1 is just switched from "0" to "1" and thus the mode of lane keeping control is not set at the current time point. In this case, the CPU determines "NO" in Step 720 and selects the first mode as the mode of lane keeping control in Step 750. The CPU causes the display device 51 to display a message indicating that the first mode is selected and causes the speaker 70 to output details of the message (hereinafter this notification process is referred to as a "mode notifying process"). Thereafter, the CPU temporarily ends this routine in Step 795.

When the mode of lane keeping control is already set at a time point at which the CPU performs the process of Step 720, the CPU determines "YES" in Step 720 and determines whether the current mode of lane keeping control is the first mode in Step 730. Here, it is assumed that the mode of lane keeping control is the first mode and the elapsed time after lane keeping control has been started is equal to or less than a predetermined time threshold value. In this case, the CPU determines "YES" in Step 730 and determines whether a first condition is satisfied in Step 740. The first condition is satisfied when the elapsed time after lane keeping control has been started is equal to or less than the predetermined time threshold value. That is, the driving support ECU 10 first executes lane keeping control in the first mode at the time point at which the lane keeping control has been started.

Based on the above assumption, the first condition is satisfied. Accordingly, the CPU determines "YES" in Step 740, selects the first mode as the mode of lane keeping control (steering support control) in Step 750, and performs the mode notifying process. Thereafter, the CPU temporarily ends this routine in Step 795.

When the CPU starts the routine from Step 700 again after a predetermined time has elapsed, the CPU determines "YES" in Steps 710, 720, and 730 and performs the process of Step 740. Here, it is assumed that the elapsed time after lane keeping control has been started is greater than the predetermined time threshold value. In this case, since the first condition is not satisfied, the CPU determines "NO" in Step 740 and determines whether a second condition is satisfied in Step 760. The second condition is the same as Condition C and is satisfied when both the left white line and the right white line within "a second predetermined distance greater than the first predetermined distance" forward from the host vehicle are detected.

When the second condition is not satisfied, the CPU determines ""NO" in Step 760, selects the first mode as the mode of lane keeping control (steering support control) in Step 750, and performs the mode notifying process. Thereafter, the CPU temporarily ends this routine in Step 795.

On the other hand, when the second condition is satisfied, the CPU determines "YES" in Step 760 and determines whether a cleaning flag F2 is "0" in Step 770. The cleaning flag F2 is a flag indicating whether the cleaning process is being performed. The cleaning flag F2 is set to "0" in the above-mentioned initialization routine. The cleaning flag F2 is set to "1" in a cleaning period from a time point at which the cleaning process is started to a time point at which the cleaning process is ended (see the routine illustrated in FIG. 10 and the routine illustrated in FIG. 11 which will be described later).

When the cleaning flag F2 is not "0" (that is, the cleaning process is being performed), the CPU determines "NO" in Step 770, selects the first mode as the mode of lane keeping control (steering support control) in Step 750, and performs the mode notifying process. Thereafter, the CPU temporarily ends this routine in Step 795.

On the other hand, when the cleaning flag F2 is "0" (that is, the cleaning process is not being performed), the CPU determines "YES" in Step 770 and determines whether the above-mentioned cleaning request is issued in Step 780.

When the cleaning request has been issued, the CPU determines "YES" in Step 780, selects the first mode as the mode of lane keeping control (steering support control) in Step 750, and performs the mode notifying process. Thereafter, the CPU temporarily ends this routine in Step 795.

On the other hand, when the cleaning request has not been issued, the CPU determines "NO" in Step 780, and selects the second mode as the mode of lane keeping control (steering support control) in Step 790. The CPU causes the display device 51 to display a message indicating that the second mode is selected and causes the speaker 70 to output details of the message. Thereafter, the CPU temporarily ends this routine in Step 795.

When the CPU starts the routine from Step 700 again after the second mode has been selected as the mode of lane keeping control in Step 790, the CPU determines "YES" in Steps 710 and 720 and performs the process of Step 730. At this time, the CPU determines "NO" in Step 730 and then performs the process of Step 760.

When the second condition has not been satisfied, the CPU determines "NO" in Step 760 and performs the process of Step 750. On the other hand, when the second condition has been satisfied, the CPU determines "YES" in Step 760 and determines whether the cleaning flag F2 is "0" in Step 770. When the cleaning flag F2 is not "0" (that is, the cleaning process is being performed), the CPU determines "NO" in Step 770 and performs the process of Step 750.

On the other hand, when the cleaning flag F2 is "0" (that is, the cleaning process is not being performed), the CPU determines "YES" in Step 770 and determines whether the cleaning request has been issued in Step 780.

When the cleaning request has been issued, the CPU determines "YES" in Step 780, selects the first mode as the mode of lane keeping control in Step 750, and performs the mode notifying process. That is, when the mode of lane keeping control is the second mode (NO in Step 730) and the cleaning request has been issued (YES in Step 780), the mode of lane keeping control (steering support control) is switched from the second mode to the first mode. Thereafter, the CPU temporarily ends this routine in Step 795.

On the other hand, when the cleaning request has not been issued, the CPU determines "NO" in Step 780 and selects the second mode as the mode of lane keeping control (steering support control) in Step 790.

Figure 8:
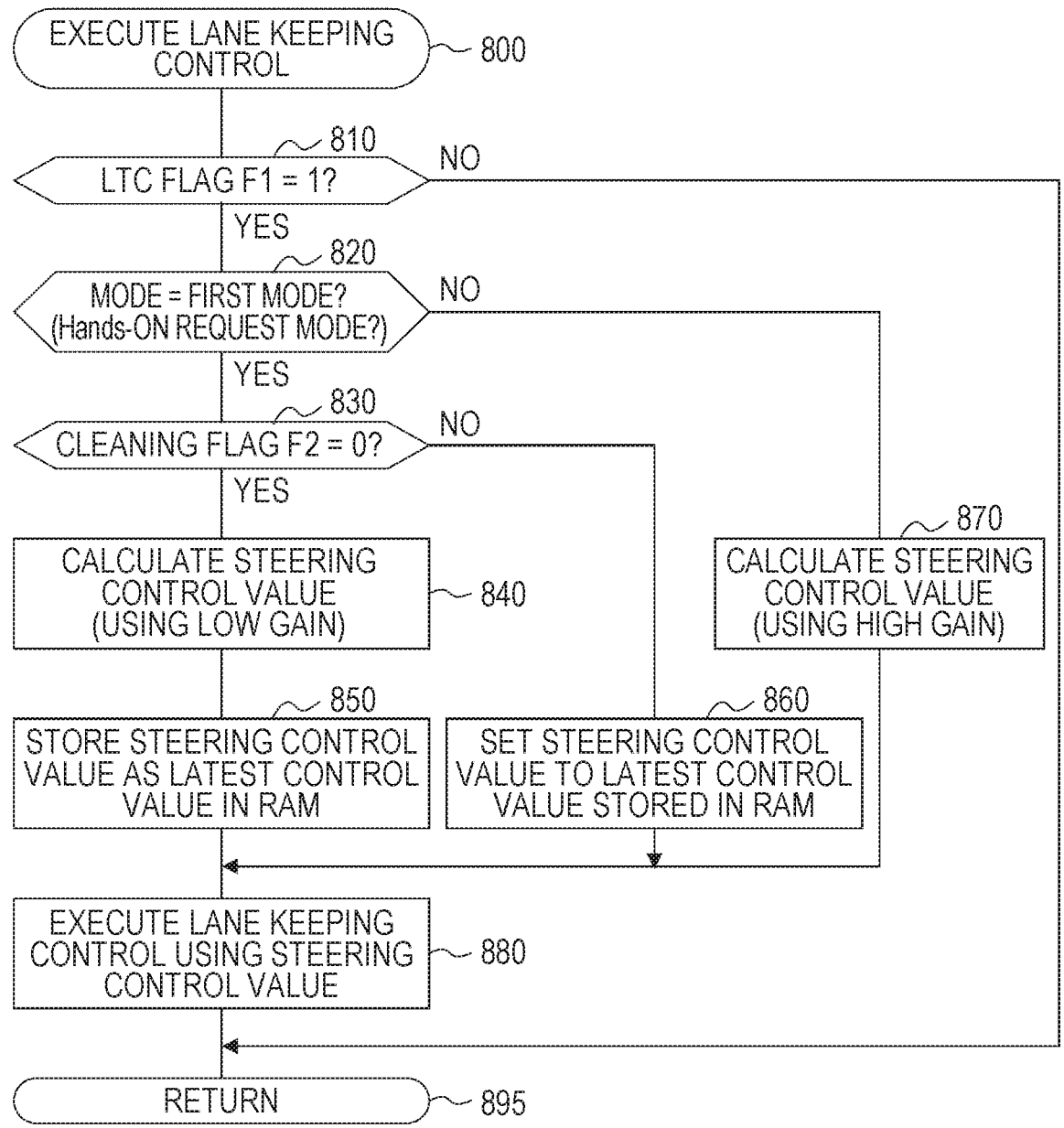
FIG. 8 is a flowchart illustrating a "lane keeping control executing routine" which is performed by the driving support ECU according to the embodiment of the disclosure.

The CPU performs a lane keeping control executing routine illustrated in the flowchart of FIG. 8 whenever a predetermined time elapses. Accordingly, at a predetermined time, the CPU starts the routine from Step 800 in FIG. 8 and determines whether the value of the LTC flag F1 is "1" in Step 810. When the value of the LTC flag F1 is not "1," the CPU determines "NO" in Step 810 and temporarily ends this routine in Step 895. In this case, none of the "first steering support control and the second steering support control" which are steering support control serving as lane keeping control is executed.

On the other hand, when the value of LTC flag F1 is "1," the CPU determines "YES" in Step 810 and determines whether the current mode of lane keeping control (steering support control) is the first mode in Step 820.

Here, when it is assumed that the current mode of lane keeping control is the first mode, the CPU determines "YES" in Step 820 and determines whether the cleaning flag F2 is "0" in Step 830.

Here, when it is assumed that the cleaning process is not performed, the cleaning flag F2 is "0." In this case, the CPU determines "YES" in Step 830, and determines a target traveling line based on vehicle-surroundings information acquired at the current time point and calculates a steering control value (a target steering angle θ*) for the first steering support control using Equation (1) in Step 840. At this time, the CPU sets the value of the control gain (for example, Klta2 and/or Klta3) in Equation (1) to a value which is less than the control gain in Equation (1) which is calculated in Step 870 which will be described later. Then, the CPU stores the steering control value as the "latest steering control value" in the RAM in Step 850. Then, the CPU executes lane keeping control (the first steering support control) using the steering control value calculated at the calculation time (that is, calculated in Step 840) in Step 880. Thereafter, the CPU temporarily ends this routine in Step 895.

On the other hand, when it is assumed that the cleaning process is performed at the time point at which the CPU performs the process of Step 830, the cleaning flag F2 is "1." In this case, the CPU determines "NO" in Step 830 and sets the steering control value to the latest steering control value stored in the RAM in Step 860. That is, when the mode of lane keeping control (steering support control) is the first mode, the first steering support control is being executed, and the cleaning process is performed, the CPU does not calculate the steering control value at this calculation time, and sets the steering control value to the "latest steering control value which is calculated at the calculation time immediately before the cleaning process is started and which is stored in the RAM." Then, the CPU executes lane keeping control (the first steering support control) using the steering control value, which is set in Step 860, in Step 880. Thereafter, the CPU temporarily ends this routine in Step 895.

On the other hand, it is assumed that the current mode of lane keeping control is the second mode when the CPU performs Step 820. In this case, the CPU determines "NO" in Step 820, and determines the target traveling line based on vehicle-surroundings information acquired at the current time point and calculates a steering control value (a target steering angle $\theta^*$) for the second steering support control using Equation (1) in Step 870. At this time, the CPU sets the value of the control gain in Equation (1) to a value which is greater than the control gain in Equation (1) which is calculated in Step 840. Then, the CPU executes lane keeping control (the second steering support control) using the steering control value, which is calculated in Step 870, in Step 880. Thereafter, the CPU temporarily ends this routine in Step 895.

Figure 9:
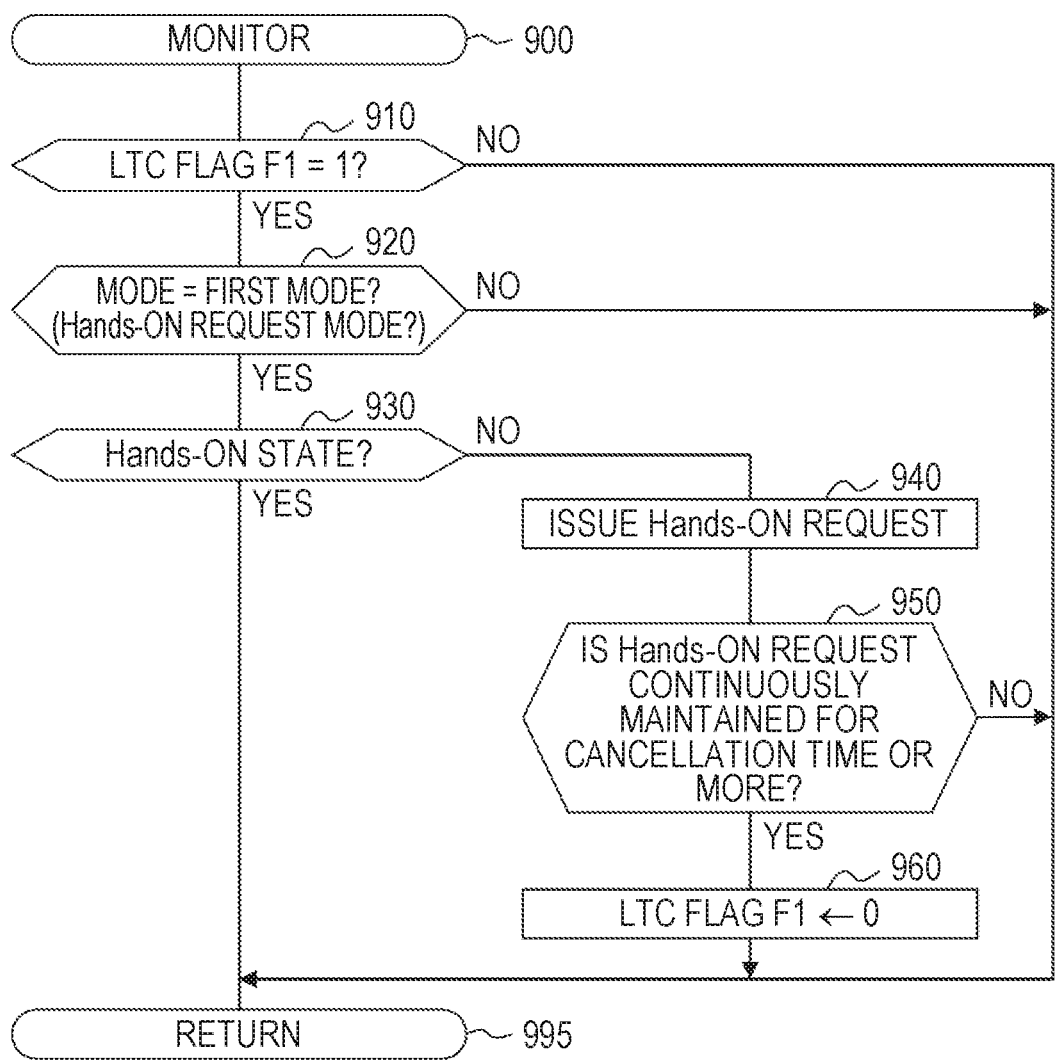
FIG. 9 is a flowchart illustrating a "monitoring routine" which is performed by the driving support ECU according to the embodiment of the disclosure.

The CPU performs a monitoring routine illustrated in the flowchart of FIG. 9 whenever a predetermined time elapses. Accordingly, at a predetermined time, the CPU starts the routine from Step 900 in FIG. 9 and determines whether the value of the LTC flag F1 is "1" in Step 910.

When the value of the LTC flag F1 is not "1" (when none of the first steering support control and the second steering support control is executed), the CPU determines "NO" in Step 910 and temporarily ends this routine in Step 995.

On the other hand, when the value of the LTC flag F1 is "1," the CPU determines "YES" in Step 910 and determines whether the current mode of lane keeping control (steering support control) is the first mode in Step 920.

When the current mode of lane keeping control (steering support control) is not the first mode (that is, when the current mode of lane keeping control is the second mode), the CPU determines "NO" in Step 920 and temporarily ends this routine in Step 995.

On the other hand, when the current mode of lane keeping control (steering support control) is the first mode, the CPU determines "YES" in Step 920 and determines whether a driver is in the "Hands-ON" state based on the state information of the driver in Step 930. When the driver is in the "Hands-ON" state, the CPU determines "YES" in Step 930 and temporarily ends this routine in Step 995.

On the other hand, when the driver is not in the "Hands-ON" state, the CPU determines "NO" in Step 930, causes the display device 51 to display a message requesting the driver to be in the Hands-ON state, and causes the speaker 70 to output details of the message (hereinafter this request is referred to as a "Hands-ON" request) in Step 940. Thereafter, the CPU determines whether the elapsed time after the "Hands-ON" request has been issued (that is, the duration of the "Hands-ON" request) is equal to or greater than a predetermined cancellation time in Step 950.

When the duration of the "Hands-ON" request is not equal to or greater than the predetermined cancellation time, the CPU determines "NO" in Step 950 and temporarily ends this routine in Step 995. On the other hand, when the duration of the "Hands-ON" request is equal to or greater than the predetermined cancellation time, the CPU determines "YES" in Step 950 and sets the value of the LTC flag F1 to "0" in Step 960. Accordingly, the lane keeping control (the first steering support control in this case) is interrupted (stopped). Thereafter, the CPU temporarily ends this routine in Step 995.

Figure 10:
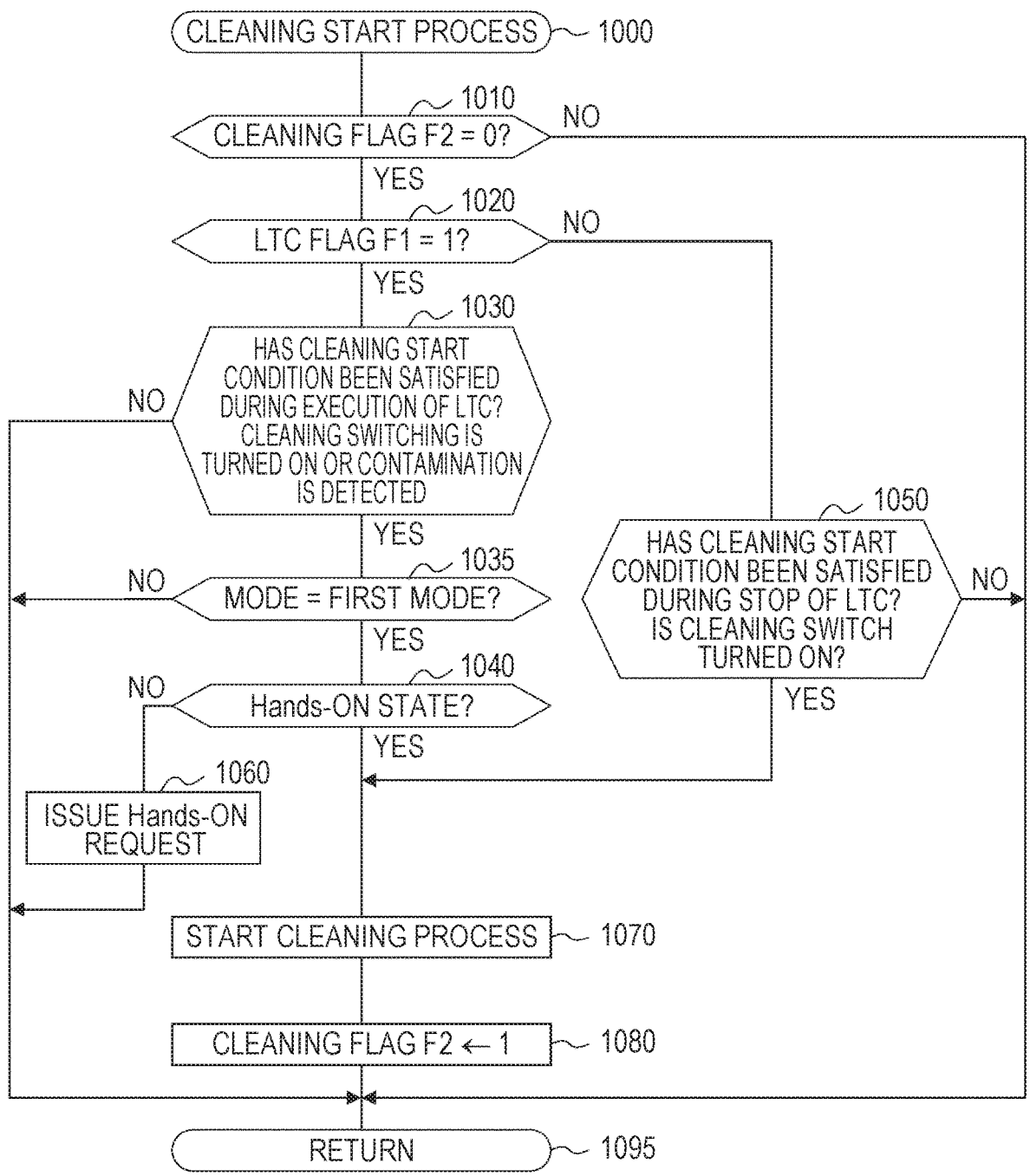
FIG. 10 is a flowchart illustrating a "cleaning start processing routine" which is performed by the driving support ECU according to the embodiment of the disclosure.

The CPU performs a cleaning start processing routine illustrated in the flowchart of FIG. 10 whenever a predetermined time elapses. Accordingly, at a predetermined time, the CPU starts the routine from Step 1000 in FIG. 10 and determines whether the value of the cleaning flag F2 is "0" in Step 1010. When the value of the cleaning flag F2 is not "0" (that is, when the current time point is in the cleaning period and the value of the cleaning flag F2 is "1"), the CPU determines "NO" in Step 1010 and temporarily ends this routine in Step 1095.

On the other hand, when the value of the cleaning flag F2 is "0" (that is, when the current time point is not in the cleaning period), the CPU determines "YES" in Step 1010 and determines whether the value of the LTC flag F1 is "1" in Step 1020.

Here, when it is assumed that lane keeping control (one of the first steering support control and the second steering support control) is being executed, the value of the LTC flag F1 is "1." In this case, the CPU determines "YES" in Step 1020, and determines whether a cleaning start condition when lane keeping control is being executed (hereinafter referred to as a "first cleaning start condition" or an "cleaning start condition during LTC execution") is satisfied in Step 1030.

The first cleaning start condition is satisfied when one of following Conditions 7 and 8 is satisfied:
Condition 7: a cleaning request is issued by operating the cleaning switch 69; and
Condition 8: a cleaning request is issued by determining that the protective window 411 corresponding to at least one of the "radar sensors 61, the first camera systems 62, and the second camera systems 63" is contaminated in a routine which is separately performed by the CPU.

That is, the first cleaning start condition is a condition which is satisfied when the cleaning request is issued. When the first cleaning start condition is not satisfied, the CPU determines "NO" in Step 1030 and temporarily ends this routine in Step 1095. In this case, the cleaning process is not started.

On the other hand, when the first cleaning start condition is satisfied, the CPU determines "YES" in Step 1030 and determines whether the mode of lane keeping control (steering support control) is the first mode in Step 1035. At this time, when the mode of lane keeping control (steering support control) is not the first mode (that is, when the mode of lane keeping control (steering support control) is the second mode), the CPU determines "NO" in Step 1035 and temporarily ends this routine in Step 1095. In this case, the cleaning process is prohibited (is not started).

On the other hand, when the mode of lane keeping control (steering support control) is the first mode at the time point at which the CPU performs the process of Step 1035, the CPU determines "YES" in Step 1035 and performs the process of Step 1040.

When the mode of lane keeping control (steering support control) is the second mode and a cleaning request is issued, the CPU determines "YES" in Step 780 in FIG. 7 which has been described above and changes the mode of lane keeping control (steering support control) to the first mode in Step 750. Accordingly, when the CPU restarts the processes of this routine after a predetermined time and performs the process of Step 1035, the CPU determines "YES" in Step 1035 and performs the process of Step 1040.

The CPU determines whether a driver is in the "Hands-ON" state based on the state information of the driver in Step 1040. When the driver is not in the "Hands-ON" state, the CPU determines "NO" in Step 1040 and issues the "Hands-ON" request in Step 1060 as described above. Thereafter, the CPU temporarily ends this routine in Step 1095. In this way, when the driver is not in the "Hands-ON" state, the cleaning process is not started.

On the other hand, when the driver is in the "Hands-ON" state, the CPU determines "YES" in Step 1040 and causes the cleaning device 65 to start the cleaning process in Step 1070. Then, the CPU sets the value of the cleaning flag F2 to "1" in Step 1080 and temporarily ends this routine in Step 1095.

On the other hand, when the value of the LTC flag F1 is "0" at a time point at which the CPU performs the process of Step 1020, the CPU determines "NO" in Step 1020 and determines whether a cleaning start condition when lane keeping control is stopped (hereinafter referred to as a "second cleaning start condition" or a "cleaning start condition during LTC execution") is satisfied in step 1050. The second cleaning start condition is satisfied when Condition 7 is satisfied.

When the second cleaning start condition is not satisfied, the CPU determines "NO" in Step 1050 and temporarily ends this routine in Step 1095. On the other hand, when the second cleaning start condition is satisfied, the CPU determines "YES" in Step 1050 and causes the cleaning device 65 to start the cleaning process in Step 1070. Then, the CPU sets the value of the cleaning flag F2 to "1" in Step 1080 and temporarily ends this routine in Step 1095.

Figure 11:
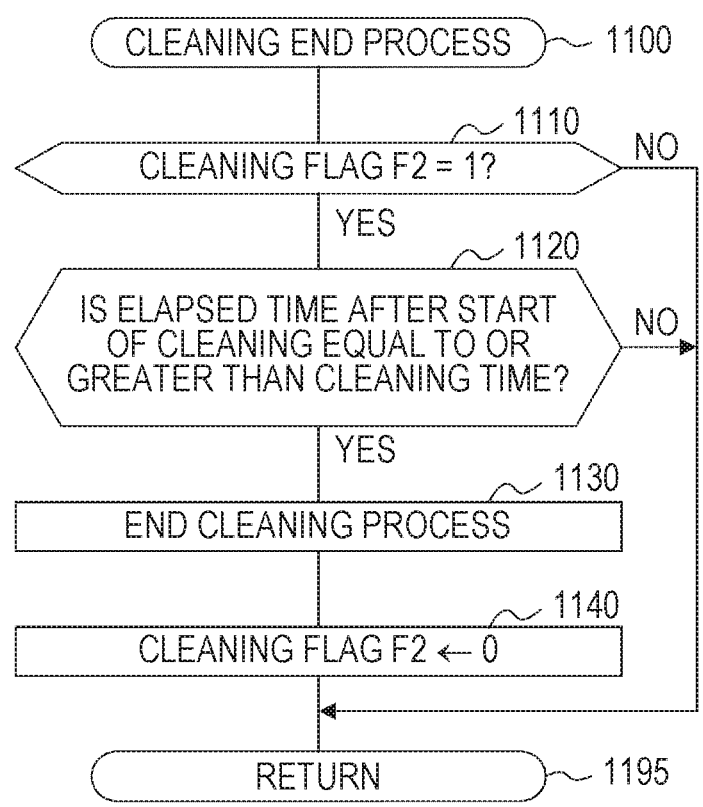
FIG. 11 is a flowchart illustrating a "cleaning end processing routine" which is performed by the driving support ECU according to the embodiment of the disclosure.

The CPU performs a cleaning end processing routine illustrated in the flowchart of FIG. 11 whenever a predetermined time elapses. Accordingly, at a predetermined time, the CPU starts the routine from Step 1100 in FIG. 11 and determines whether the value of the cleaning flag F2 is "1" in Step 1110.

When the value of the cleaning flag F2 is not "1," the CPU determines "NO" in Step 1110 and temporarily ends this routine in Step 1195.

On the other hand, when the value of the cleaning flag F2 is "1" (that is, when the cleaning process is being performed at the current time point), the CPU determines "YES in Step 1110 and determines whether the elapsed time from a time point at which the cleaning process has been started is equal to or greater than a predetermined cleaning time (for example, 1 second) in Step 1120. When the elapsed time from the time point at which the cleaning process has been started is less than the predetermined cleaning time, the CPU determines "NO" in Step 1120 and temporarily ends this routine in Step 1195.

On the other hand, when the elapsed time from the time point at which the cleaning process has been started is equal to or greater than the predetermined cleaning time, the CPU determines "YES" in Step 1120 and ends the cleaning process using the cleaning device 65 in Step 1130. Then, the CPU sets the value of the cleaning flag F2 to "0" in Step 1140 and temporarily ends this routine in Step 1195.

As described above, this embodied device permits execution of the cleaning process when the mode of lane keeping control (steering support control) is the first mode (when the first steering support control is being executed) (YES in Step 1035). This embodied device determines whether the driver is in the "Hands-ON" state based on the state information of the driver (Step 1040) when the mode of lane keeping control (steering support control) is the first mode and the cleaning request is issued, and cause the cleaning device 65 to perform the cleaning process (Step 1070) when the driver is in the "Hands-ON" state (YES in Step 1040). Accordingly, even when the position (the lateral position) of the vehicle deviates from an appropriate position in a travel lane during execution of the cleaning process, the driver can immediately correct the position of the vehicle by immediately operating the steering wheel 302.

On the other hand, this embodied device prohibits execution of the cleaning process when the mode of lane keeping control (steering support control) is the second mode (when the second steering support control is being executed) (NO in Step 1035). Accordingly, the cleaning process is not performed during execution of the second steering support control not based on the premise of the "Hands-ON" state. When the mode of lane keeping control is the second mode and the cleaning request is issued (NO in Step 730 and YES in Step 780), this embodied device switches the mode of lane keeping control from the second mode to the first mode (Step 750).

When the mode of lane keeping control is the first mode, the "second condition in which selection of the second mode is permitted" is satisfied (YES in Step 730, NO in Step 740, and YES in Step 760), and the cleaning process is being performed (NO in Step 770) or the cleaning request is issued (YES in Step 780), this embodied device maintains the first mode (Step 750). As a result, since the cleaning process is not performed in the second mode, it is possible to decrease a likelihood that a state in which the position of the vehicle deviate greatly from an appropriate position in the travel lane will be maintained.

When the mode of lane keeping control is switched from the second mode to the first mode, this embodied device causes the display device 51 to display a message indicating that switching and causes the speaker 70 to output details of the message. By this notification of a message, the driver can immediately change the driver's state to the Hands-ON state. Accordingly, it is possible to more rapidly perform the cleaning process.

In a period from a time point at which the cleaning process is started to a time point at which the cleaning process is ended (NO in Step 830 in the routine illustrated in FIG. 8), this embodied device changes the steering angle of the vehicle based on the steering control value which is stored in the RAM immediately before the cleaning process is started (Steps 860 and 880). Accordingly, it is possible to decrease a likelihood that the position of the host vehicle will deviate greatly from an appropriate position in the travel lane in the cleaning period.

The invention is not limited to the above-mentioned embodiment and can employ various modified examples within the scope of the invention.

Definition of the "Hands-ON" state is not limited to the above-mentioned example. For example, the "Hands-ON" state has only to be a state in which a driver is touching the steering wheel 302 or in which a driver can operate subjectively. In this case, since a sight line of a driver is not to be monitored, the sight line sensor 67 may be omitted. In this configuration, the driving support ECU 10 executes the first steering support control based on the premise that a driver is touching the steering wheel 302 when the mode of lane keeping control is the first mode. The CPU of the driving support ECU 10 determines that the driver is in the "Hands-ON" state when the CPU performs Step 930 in the routine illustrated in FIG. 9 or Step 1040 in the routine illustrated in FIG. 10 and the driver is touching the steering wheel 302.

Some of the radar sensor 61, the first camera systems 62, and the second camera systems 63 may be disposed in the passenger compartment of the vehicle. For example, the first camera system 62a may be disposed in the vicinity of the front windshield in the passenger compartment. In this configuration, the first camera system 62a acquires image data of the area in front of the vehicle via the windshield (the front windshield) disposed on the detection surface side thereof. In this configuration, the windshield (the front windshield) also serves to protect the detection surface of the first camera system 62a and thus the front windshield corresponds to the protective window (the window portion). The driving support ECU 10 may detect contamination of the front windshield from the image data of the first camera system 62a. When contamination on the front windshield is detected, the driving support ECU 10 causes a cleaning device for the front windshield which is normally mounted in the vehicle to perform a cleaning process as the cleaning function of cleaning the front windshield. The cleaning device for the front windshield sprays a cleaning fluid (so-called window washer fluid) onto the front windshield and activates a wiper. In this specification, a protective window and a glass window which are disposed on a detection surface side of a camera may be simply referred to as a "window portion."

When a cleaning request is issued, the driving support ECU 10 may select some of the protective windows 411 and perform the cleaning process on only the selected protective windows. For example, when contamination is detected on the protective window 411a corresponding to the radar sensor 61a, the driving support ECU 10 may clean only the protective window 411a by setting only an ON-OFF valve 503 of the cleaning portion 403a to an open state.

The cleaning device 65 may be configured to clean the protective window by spraying only a cleaning fluid or only air onto the protective window.

For example, the cleaning device 65 may not include the "junction joint 502, the electromagnetic ON-OFF valve 503, and the electric air pump 504." In this configuration, the pipe 404 is directly connected to the nozzle portion 501. Accordingly, the cleaning device 65 may be configured to feed a cleaning fluid with the cleaning fluid pump 402 and to spray only the cleaning fluid onto the protective window 411.

The cleaning switch 69 can be a switch which is operated when a driver requests a cleaning process and which generates a signal indicating the request. The cleaning switch 69 may be a device that recognizes a cleaning request from a driver using a speech recognition device. This device is equivalent to a switch which is operated with voice and can constitute an operation switch (an operation unit) in the claims.

Image data acquired by the second camera systems 63 may be used for lane keeping control.

The processes associated with this embodied device may be applied to steering support control (for example, parking or garage-leaving support control and lane change control) other than lane keeping control. The parking or garage-leaving support control which is also called intelligent parking assist (IPA) is steering support control in which a target route (a target traveling line) from the current position of the host vehicle to a predetermined target position is set and the steering angle of the host vehicle is changed such that the host vehicle moves along the target route. The lane change control which is also called lane change support (LCS) is steering support control in which the steering angle of the host vehicle is changed such that the host vehicle changes the lane from the travel lane to a neighboring lane along a target path (a target traveling line).

What is claimed is:

1. A driving support device comprising:
   a first detection unit including a first sensor and a camera configured to detect vehicle-surroundings information on vehicle surroundings using light or radio waves passing through a window portion;
   a second detection unit including a second sensor configured to detect state information of a driver on a driver's state;
   an electric control unit configured to perform steering support control to change a steering angle of a vehicle such that the vehicle travels along a target traveling line which is set based on the vehicle-surroundings information; and
   a cleaning device configured to perform cleaning by spraying at least one of a cleaning fluid and air onto the window portion when a cleaning request is issued, wherein
   the electric control unit is further configured to:
   select at least one of the following modes for a steering support control: (i) a first mode in which steering support control is executed based on a premise that the driver is touching a steering wheel, and (ii) a second mode in which steering support control is executed that is not based on the premise that the driver is touching the steering wheel and is based on the vehicle-surroundings information,
   operate in the selected mode, and
   permit cleaning by the cleaning device when the cleaning request is issued during execution of the steering support control and the selected mode of the steering support control is the first mode, and prohibit cleaning by the cleaning device when the cleaning request is issued during execution of the steering support control and the selected mode of the steering support control is the second mode.

2. The driving support device according to claim 1, wherein the electric control unit is configured to determine whether the driver is touching the steering wheel based on the state information of the driver when the selected mode of the steering support control is the first mode and the cleaning request is issued and to cause the cleaning device to perform cleaning when it is determined that the driver is touching the steering wheel.

3. The driving support device according to claim 1, wherein the electric control unit is configured to switch the mode of the steering support control from the second mode to the first mode when the selected mode of the steering support control is the second mode and the cleaning request is issued.

4. The driving support device according to claim 1, wherein:
   the electric control unit is configured to calculate and store a steering control value for causing the vehicle travels along the target traveling line whenever a predetermined time elapses in a period other than a cleaning period from a time point at which cleaning by the cleaning device is started to a time point at which the cleaning is ended when the mode of the steering support control is the first mode and to change the steering angle of the vehicle based on the steering control value; and
   the electric control unit is configured to change the steering angle of the vehicle based on the steering control value stored immediately before the time point at which the cleaning is started in the cleaning period.

* * * * *

UNITED STATES PATENT AND TRADEMARK OFFICE
CERTIFICATE OF CORRECTION

| | | |
|---|---|---|
| PATENT NO. | : 11,001,270 B2 | Page 1 of 1 |
| APPLICATION NO. | : 16/373936 | |
| DATED | : May 11, 2021 | |
| INVENTOR(S) | : Masumi Dakemoto | |

It is certified that error appears in the above-identified patent and that said Letters Patent is hereby corrected as shown below:

On the Title Page

Item (54) and in the Specification at Column 1, Lines 1-3:
Delete "DRIVING SUPPORT DEVICE INCLUDING A CLEANING DEVICE FOR CLEANINING A WINDOW PORTION"
Insert --DRIVING SUPPORT DEVICE INCLUDING A CLEANING DEVICE FOR CLEANING A WINDOW PORTION--

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*